350-96.24
10/27/81          OR    4,297,000         SR

United States Patent [19]
Fries

[11] 4,297,000
[45] Oct. 27, 1981

[54] SOLAR LIGHTING SYSTEM

[76] Inventor: James E. Fries, 7860 Valley View, Apt. 242, Buena Park, Calif. 90620

[21] Appl. No.: 2,620

[22] Filed: Jan. 11, 1979

[51] Int. Cl.³ .............................................. G02B 5/16
[52] U.S. Cl. ............................. 350/96.24; 350/96.10; 350/265; 350/289; 353/3; 362/32
[58] Field of Search .................. 40/547; 126/417, 425; 350/96.10, 96.24, 258, 262, 265, 289, 296; 353/3; 362/1, 32

[56] References Cited

U.S. PATENT DOCUMENTS

| | | | |
|---|---|---|---|
| 507,999 | 11/1893 | Davis | 353/3 |
| 2,022,144 | 11/1935 | Nicolson | 353/3 |
| 2,227,861 | 1/1941 | Petrone | 40/441 |
| 3,157,089 | 11/1964 | Menefee | 350/96.10 X |
| 3,278,739 | 10/1966 | Royka et al. | 362/32 |
| 3,407,122 | 10/1968 | Dickinson | 353/3 X |
| 3,656,844 | 4/1972 | Botskor | 353/3 |
| 4,026,267 | 5/1977 | Coleman | 350/96.24 X |

FOREIGN PATENT DOCUMENTS 52-15339  2/1977  Japan ............................. 350/96.10

OTHER PUBLICATIONS

Edwards, "Optics for Natural Lighting", *NASA Tech Briefs*, vol. 3, No. 2, Summer 1978, pp. 209-211.

*Primary Examiner*—John D. Lee
*Attorney, Agent, or Firm*—Edward A. Sokolski

[57] ABSTRACT

Light energy from the sun is directed by a solar collector device onto the end of a bundle of optical fibers. Means which may comprise a tracking system is provided to maintain the collector device directed toward the sun throughout the day so that a maximum amount of light energy is collected thereby. The optical fiber bundle is run into a building or other place where the light energy is to be utilized where the bundle may be split off to provide light in various areas through various utilization devices, such as lamps, indicator devices, signs, etc.

12 Claims, 5 Drawing Figures

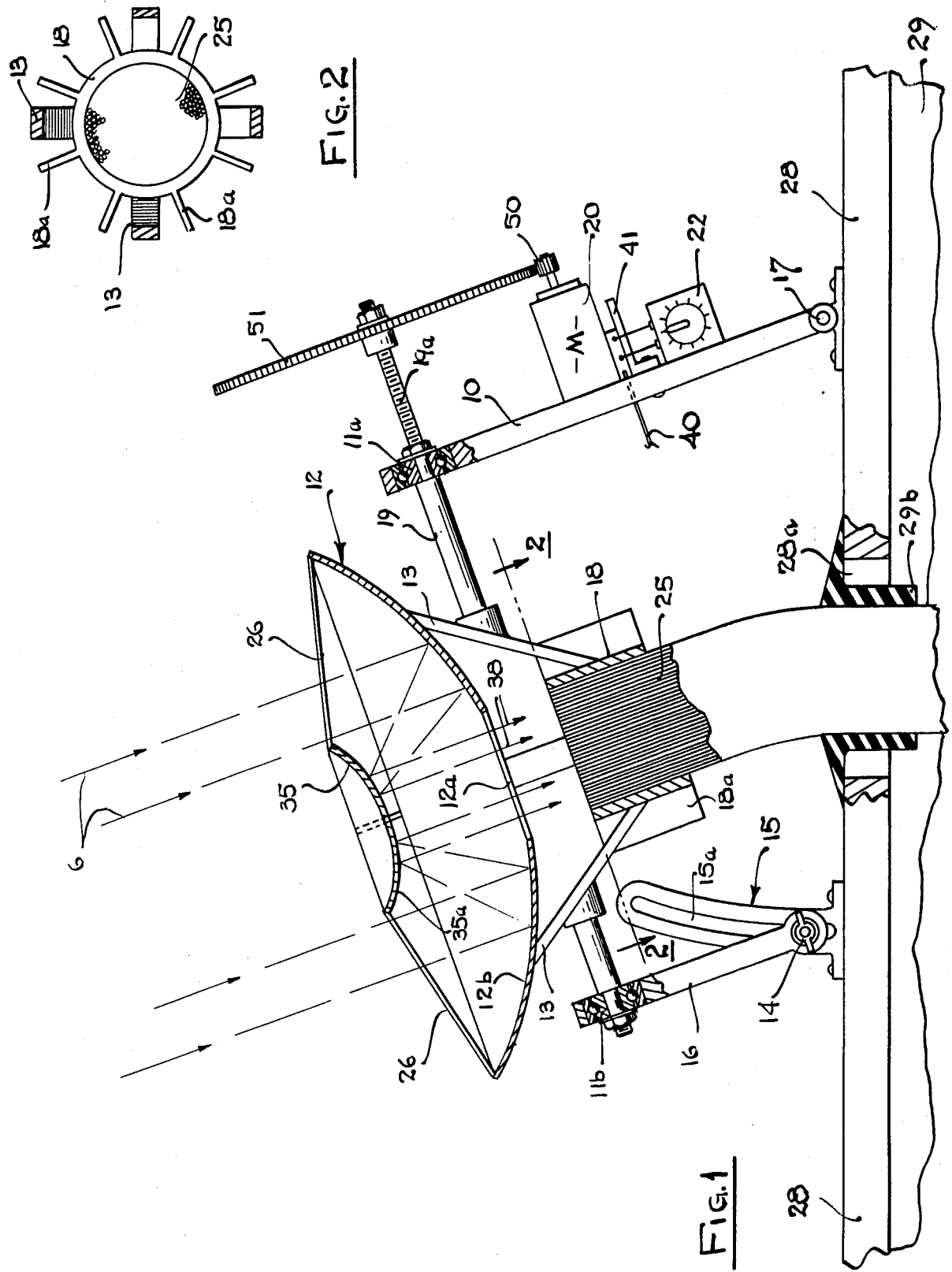

SOLAR LIGHTING SYSTEM

This invention relates to a lighting system, and more particularly to such a system which utilizes solar energy as its light source.

The use of solar energy has received widespread attention in recent years as an approach to the conservation of energy. While many solar energy systems have been developed for heating, distillation, and the generation of electricity, little or no attention has been given to its potential for providing light to enclosed quarters where a substantial amount of electrical energy is used during the daylight hours in offices, homes, theaters, restaurants, stores, factories, tunnels, mines, etc.

Optical fiber lines and cables of one type or another have been available for many years, particularly for applications such as transmission of light to indicator lights, for carrying modulated light waves in communication systems (these light waves often being generated by lasers), and in optic data links. In U.S. Pat. No. 3,278,739 to Royka et al. and U.S. Pat. No. 2,227,861 to Petrone, the use of glass rods and fiber optics for distributing light from a single light source to a plurality of light emitters is shown. In these systems, however, the light energy is taken from an artificial light source and there is no suggestion of means for employing solar energy as the source of light energy.

The present invention provides a system for collecting light from the sun and transmitting this light by fiber optics to light utilization devices, thereby decreasing the need for artificial light energy sources during broad daylight hours, and in this manner conserving energy. The system of the present invention also can be used as an emergency lighting system to augment or replace the regular lighting system in the event of a power failure or power reduction. The system is also useful to provide lighting in mines, reducing power needs for electric lighting or gas lighting, the former of which is expensive in wilderness areas and the latter of which can be somewhat hazardous. By using a photocell to regulate the electric lights, a constant source of illumination could be provided on cloudy or overcast days when solar energy is inadequate or intermittent in intensity.

It is therefore an object of this invention to provide means for conserving energy.

It is further an object of this invention to provide an emergency lighting system.

It is an additional object of this invention to provide a lighting system which utilizes the sun's rays for its lighting source.

Other objects of this invention will become apparent as the description proceeds in connection with the accompanying drawings of which:

FIG. 1 is an elevational view of a preferred embodiment of the invention;

FIG. 2 is a cross sectional view taken along the plane indicated by 2—2 in FIG. 1 and illustrating the fiber bundle employed in a preferred embodiment and its associated cooling fins;

Figure 3:
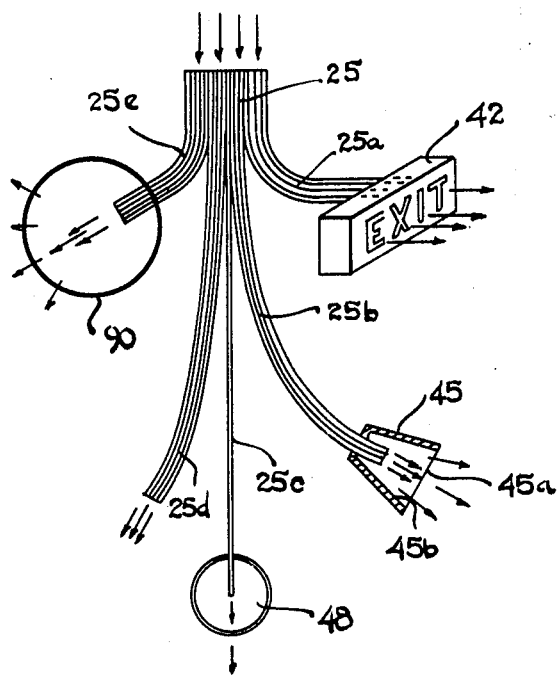
FIG. 3 is a schematic illustration illustrating some of the various light utilization devices which may be used with the optical fiber terminals.

Briefly described, the system of the invention is as follows: A collector device, which in a preferred embodiment is in the form of a parabolic mirror operating in conjunction with a convex mirror (employed to make the light rays more parallel so they will enter the optical fibers at an optimum angle) and which in other embodiments comprises a focusing lens or a parabolic mirror by itself, is used to focus light from the sun onto the ends of a bundle of optical fibers which are supported in line with the light beam provided by the collector device. A tracking system is employed to slew or position the collector so that it remains directed on the sun throughout the day. For illustrative purposes, an equatorial mounting of the mirrors is shown. An azimuthal or other mounting could also be employed. The optical fiber bundle is fed from the outside into the areas to be illuminated where the bundle may be separated out into smaller bundles if desired and even single fibers separated for providing light energy to various light utilization devices, such as lamps, lighted signs, indicators, bulbs or tubes with light dispersing properties, etc., as may be desired.

Referring now to FIGS. 1 and 2, a preferred embodiment of the invention is illustrated. Collector device 12, which is in the form of a dish reflective on the upper surface is supported by means of braces 13 which are fixedly attached to shaft 19 and ring-shaped holder 18. The collector has a parabolic reflector 12b on one side thereof. Holder 18 is used to hold the optical fiber bundle 25 in place. The shaft 19 is rotatably supported by means of roller bearings 11a and 11b on support bars 10 and 16, respectively. Bar 10 is pivotally supported on base member 28 by means of hinge member 17. Base member 28 may be mounted against the roof 29 of the building. Bar 16 is attached by means of wing nut and washer to a slotted bracket 15, this bracket being supported on base member 28. Bar 16 may thus be slid along the slot 15a of the bracket to adjust the angle of mirror 12 on a north-south axis. The wing nut 14 is used to lock the bar in the desired position. This adjustment is made on a daily or weekly basis to position the parabolic mirror along an optimum axis for collecting the sun's rays.

Supported above the parabolic mirror 12 by means of struts 26 is a convex mirror 35 which has a convex reflective surface 35a. Parabolic mirror 12 has a circular aperture 12a formed in the center thereof, this aperture having a diameter at least as large as that of the fiber bundle 25. The holder 18 for the fiber optical bundle has a plurality of cooling fins 18a thereon to dissipate heat energy. In larger mirror assemblies, the ring shaped holder 18 may be hollowed and cooling water circulated through it to effect an additional cooling of the optical fiber bundle.

Fixedly supported on a shelf 41 which in turn is supported on bar 10 is an electric motor 20. The operation of this motor is controlled by timer 22 which is also supported on bar member 10. The drive shaft of motor 20 has a pinion gear 50 attached thereto, this pinion gear rotatably driving ring gear 51 which is fixedly attached to an undercut threaded portion 19a of shaft 19. Timer 22 is set and adjusted such that the shaft 19, parabolic mirror 12 and convex mirror 35 which are supported thereon are rotatably driven to follow the sun throughout the day on an east-west axis. The mirrors move on this axis 15 degrees of rotation per hour and stop at a preset time at sundown, the mirrors being set at a predetermined position fixed at a time in the morning.

Fiber optical bundle 25 and power line 40 are fed through aperture 28a in base 28 and a corresponding aperture and sealing gasket 29b in the top of roof 29 into the areas where illumination is required as shown in FIG. 3. As shown in FIG. 3, bundle 25 may be split off into a first sub-bundle 25a which is utilized to illuminate a transparent sign 42, for example, and even into a second sub-bundle 25b which is fed into a clear glass "bulb" device 45 which has a glass window 45a and a reflective conical side portion 45b, this device functioning as a lamp. Single fiber 25c is fed to indicator bulb 48. Additional sub-bundles 25d may be used for other lighting purposes and sub-bundle 25e may be used to illuminate bulb 90 with a light scattering coating or etching.

Thus as can be seen, the light rays 6 from the sun are focused by parabolic reflector 12 onto convex mirror surface 35 which reflects the focused light rays 38 onto optical bundle 25. The light is transmitted by the fibers of optical fiber bundle 25 into the areas to be lighted where the bundle may be divided into several bundles and individual fibers to illuminate various lighting devices. Suitable optical fibers and cables which may be formed into bundles are generally commercially available. In an operative embodiment of the invention, an optical fiber cable whose individual fibers have diameters of 68 microns is employed.

Figure 4:
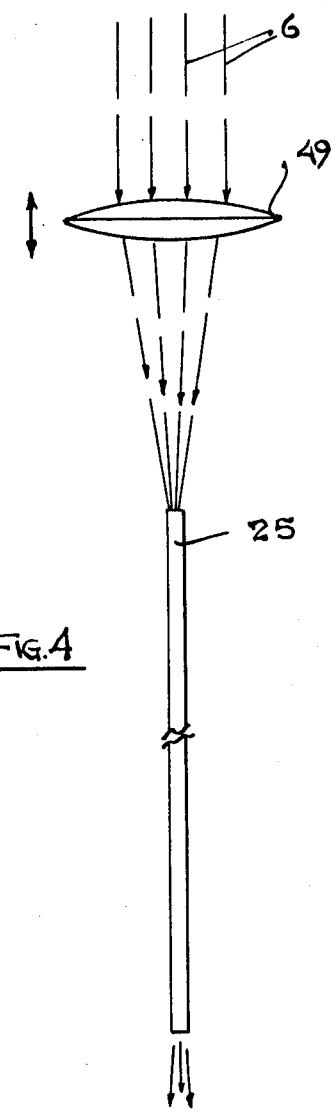
FIG. 4 is an alternative embodiment of a collector which may be utilized in implementing the invention.

Referring now to FIG. 4, a second embodiment of the invention is schematically illustrated. This second embodiment differs from the first in that rather than employing a mirror system for collecting the sunlight, the sunlight is focused on the optical fibers by means of a lens 49. Thus, the light rays 6 are concentrated on the optical fibers 25 by the lens. Lens 49 may be mounted along with the fiber optical bundle and driven so as to track the sun in the same manner as for the previous embodiment. The lens 49 may also employ a double concave lens to make the rays more parallel for a more efficient entry into the optical fibers.

Figure 5:
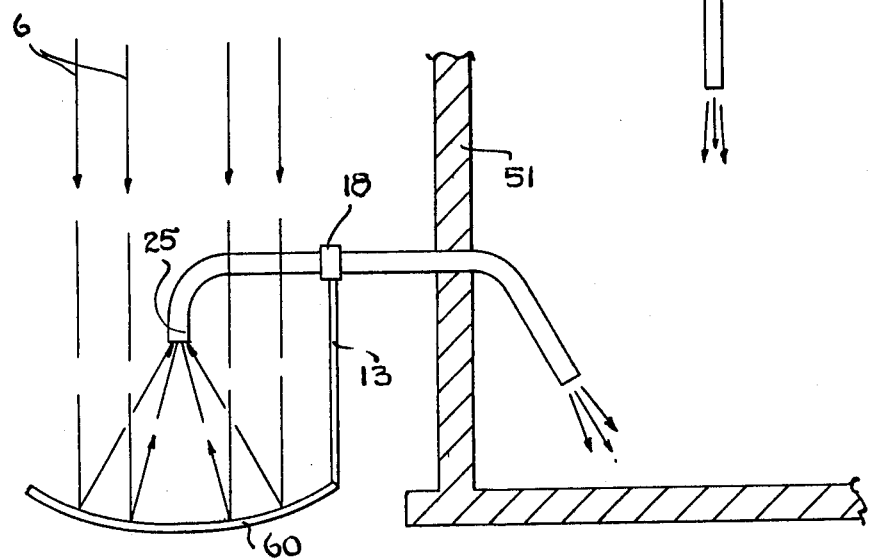
FIG. 5 is a further embodiment of a collector which may be utilized in implementing the invention.

Referring now to FIG. 5, a further embodiment of the invention is shown. In this embodiment, a single parabolic mirror 60 is used with the sun's rays 6 being focused by this mirror onto the ends of fiber optical bundle 25. This mirror may also employ a double concave lens to cause the light rays to be more parallel. Here, again, the mirror may be supported and driven to track the sun in the same manner as for the first embodiment. The optical bundle or cable 25 is fed through the wall 51 of a building.

As has been noted, the system of the invention has widespread application, not only as a substitute or augmentative lighting system in a great many situations, but also as a back-up system for emergency use in the event that the power should fail. In such situation, the tracking system may not have electric drive but could be set manually or have a battery to power the electric drive under emergency situations.

While the invention has been described and illustrated in detail, it is to be clearly understood that this is intended by way of illustration and example only and is not to be taken by way of limitation, the spirit and scope of this invention being limited only by the terms of the following claims.

I claim:

1. A lighting system employing solar light energy comprising:
   fiber optical line means,
   means for focusing the rays of the sun onto one end of said fiber optical line means,
   means for slewing the focusing means and said one end of said fiber optical means together so as to follow the sun with the rays of the sun being maintained in focus on said fiber optical line means,
   light utilization means, and
   means for coupling the other end of said fiber optical line means to said light utilization means so as to effect the illumination of said light utilization means.

2. The system of claim 1 wherein said fiber optical line means comprises a bundle of optical fibers.

3. The system of claim 2 wherein said light utilization means comprises a plurality of light utilization devices, said bundle of optical fibers being split into a plurality of bundles, each of said bundles being coupled to a separate one of said devices.

4. The system of claim 1 wherein the means for focusing the sun's rays comprises a collector device having an aperture formed in the center thereof, a parabolic reflector on one side thereof, a convex mirror, means for supporting said one end of said fiber optical line means opposite said aperture on the other side of said collector device, and means for supporting said convex mirror opposite the parabolic reflector of said collector device at a position which is substantially at the focus of the parabolic reflector to direct the light rays focused by the reflector onto said one end of said fiber optical line means.

5. The system of claim 4 and further including means for slewing said collector device and said convex mirror so as to follow the sun.

6. The system of claim 4 wherein the means for supporting said one end of the fiber optical line means comprises a ring-shaped holder which holds said one end of said line means and means for attaching said holder to said collector device.

7. The system of claim 6 and further including cooling fins extending outwardly from said holder.

8. The system of claim 1 wherein the means for focusing the rays of the sun comprises an optical lens.

9. The system of claim 1 wherein the means for focusing the rays of the sun comprises a parabolic reflector.

10. A lighting system employing solar light energy comprising:
   a collector device in the form of a dish having an aperture in the center thereof, a parabolic reflective surface on one side thereof,
   a fiber optical cable formed from a plurality of optical fiber lines joined together into a bundle,
   ring holder means for holding one end of said fiber optical bundle together,
   support means for supporting said collector device for rotatable movement about a predetermined axis,
   means for supporting said ring holder means on said collector device for movement therewith with said one end of said cable on the opposite side of said collector device and facing directly opposite said aperture, the one end of the fiber optical bundle held by the ring holder means moving along with the collector device to maintain said one end of said cable facing directly opposite said aperture,
   a convex mirror,
   means for supporting said convex mirror on said collector device on said one side thereof approximately at the parabolic focal distance from said parabolic surface,
   light utilization means, means for coupling the other end of said cable to said light utilization means, and means for slewing said collector device about said predetermined axis so as to maintain said collector device directed at the sun, whereby the sun's rays are focused on said convex mirror by said parabolic surface, said convex mirror directing the focused rays onto said one end of said fiber optical cable and transmitted to said light utilization means.

11. The system of claim 10 and further including cooling fins extending outwardly from said ring holder means.

12. The system of claim 10 wherein said slewing means comprises a motor, a timer for controlling the actuation of said motor and a gear train for coupling said motor to said collector device.

* * * * *